United States Patent
Lee et al.

(10) Patent No.: US 8,755,067 B2
(45) Date of Patent: Jun. 17, 2014

(54) IMAGE FORMING APPARATUS AND METHOD OF PROCESSING PRINTING OPERATION THEREOF

(75) Inventors: Jun-seung Lee, Seongnam-si (KR); Song-baik Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 939 days.

(21) Appl. No.: 12/504,974

(22) Filed: Jul. 17, 2009

(65) Prior Publication Data

US 2010/0073715 A1 Mar. 25, 2010

(30) Foreign Application Priority Data

Sep. 25, 2008 (KR) ........................ 10-2008-0094141

(51) Int. Cl.
*G06F 3/12* (2006.01)

(52) U.S. Cl.
USPC ........... 358/1.15; 400/61; 235/375; 358/1.14; 358/1.13; 348/207.2; 709/220; 709/201

(58) Field of Classification Search
None
See application file for complete search history.

(56) References Cited

U.S. PATENT DOCUMENTS

| | | | |
|---|---|---|---|
| 6,928,564 B2 * | 8/2005 | Tada et al. ..................... 713/321 |
| 6,947,156 B1 * | 9/2005 | Jeyachandran et al. ...... 358/1.15 |
| 7,040,530 B2 | 5/2006 | Watanabe et al. |
| 7,180,614 B1 * | 2/2007 | Senoo et al. ................. 358/1.15 |
| 7,936,373 B2 * | 5/2011 | Masumoto et al. ......... 348/207.2 |
| 2002/0145748 A1 * | 10/2002 | Nonoyama et al. .......... 358/1.14 |
| 2003/0161670 A1 | 8/2003 | Watanabe et al. |

FOREIGN PATENT DOCUMENTS

JP 2003-256165 9/2003

* cited by examiner

*Primary Examiner* — Ashish K Thomas
(74) *Attorney, Agent, or Firm* — Stanzione & Kim, LLP

(57) ABSTRACT

A method of processing a printing operation in an image forming apparatus in which a plurality of printing jobs are processed in a single printing job includes generating connection information to unify a plurality of printing jobs, changing the plurality of printing jobs to a single printing job using the connection information, and printing data corresponding to the single printing job.

19 Claims, 6 Drawing Sheets

IMAGE FORMING APPARATUS AND METHOD OF PROCESSING PRINTING OPERATION THEREOF

CROSS-REFERENCE TO RELATED APPLICATIONS

This application claims priority under 35 U.S.C. §119(a) from Korean Patent Application No. 2008-0094141, filed on Sep. 25, 2008, in the Korean Intellectual Property Office, the contents of which are incorporated herein by reference in its entirety.

BACKGROUND

1. Field of the Invention

The present general inventive concept relates to an image forming apparatus and a method of processing a printing operation thereof, and more particularly, to an image forming apparatus to process a printing operation by changing a plurality of printing jobs into a single printing job using connection information regarding the plurality of printing jobs and a method of processing a printing operation thereof.

2. Description of the Related Art

Image forming apparatuses print onto printing media data which are generated by the image forming apparatuses or received from external apparatuses. Image forming apparatuses include copy machines, printers, fax machines, or multifunctional peripherals (MFPs) combining these features.

If a user desires to print out a file containing text or graphics which the user produces on a personal computer (PC) using application programs, the user must transmit the file directly to the PC or to a printer connected via a network in order to output the file on printing media.

When printing jobs received through various interfaces and protocols are processed, printing operations are performed separately. In this situation, if a plurality of printing jobs are related to each other, a host device collects the printing jobs related to each other, changes the printing jobs to a single printing job, and transmits the single printing job to an image forming apparatus. Accordingly, the image forming apparatus must set properties of the printing jobs to perform the printing operation, causing inconvenience to a user.

Also, if a user desires to select and print a specific file, the user must search for the specific file. In this situation, if each file is transmitted over a different interface and uses a different protocol, a command for performing a printing operation must be executed for each file, causing inconvenience to the user.

SUMMARY

The present general inventive concept provides an image forming apparatus to change a plurality of printing jobs to a single printing job and a method of processing the printing operation thereof.

Additional features and utilities of the present general inventive concept will be set forth in part in the description which follows and, in part, will be obvious from the description, or may be learned by practice of the general inventive concept.

Exemplary embodiments of the present general inventive concept may be achieved by providing a method for processing a printing operation in an image forming apparatus, the method including generating connection information to unify a plurality of printing jobs, changing the plurality of printing jobs to a single printing job using the connection information, printing data corresponding to the single printing job, and setting job properties to be commonly applied to the plurality of printing jobs, wherein the single printing job is generated by unifying the plurality of printing jobs to which the commonly applied job properties are applied.

The operation of generating connection information may include inputting an order of processing the plurality of printing jobs; and generating connection information to unify the plurality of printing jobs according to the processing order and to apply the set job properties.

The method may further include providing a user interface (UI) to select at least one external apparatus connectable to the image forming apparatus; and requesting that a printing job be transmitted from the external apparatus selected using the UI.

The method may further include allowing communication only between the image forming apparatus and the selected external apparatus, and receiving at least one printing job from the selected external apparatus.

The connection information may include information regarding an order for processing printing jobs corresponding to an order in which the plurality of printing jobs were previously processed.

The plurality of printing jobs may be received over different interfaces and using different protocols.

The method may further include displaying information regarding protocols and interfaces corresponding to the received printing jobs.

The plurality of printing jobs may include at least one of a scanning job, a printing job, a faxing job, a copying job and a pre-stored job.

The job properties may include at least one of the number of sheets to be printed, duplex printing, N-up printing, color or monochrome printing, and post-processing operations.

Exemplary embodiments of the present general inventive concept may also be achieved by providing an image forming apparatus, including at least one interface to receive a plurality of printing jobs; a storage unit to store connection information to unify the plurality of printing jobs; a controlling unit to change the plurality of printing jobs to a single printing job using the connection information and to print data corresponding to the single printing job; and a user interface (UI) unit to set job properties to be commonly set to the plurality of printing jobs, wherein the single printing job is generated by unifying the plurality of printing jobs to which the commonly applied job properties are applied.

The UI unit may provide a UI to input an order of processing the plurality of printing jobs, wherein the controlling unit may unify the plurality of printing jobs according to the processing order, and apply the set job properties.

The UI unit may provide a UI to select at least one external apparatus connectable to the image forming apparatus, and the controlling unit may request that a printing job be transmitted to the external apparatus selected using the UI.

The controlling unit may allow communication with only the selected external apparatus, and receive at least one printing job from the selected external apparatus.

The controlling unit may generate connection information so that printing options set by the external apparatus are applied to the received printing jobs, and if the order for processing jobs to which the printing options are applied is input, the controlling unit may unify the plurality of printing jobs according to the processing order and applies the set printing job properties.

The controlling unit may include information regarding an order for processing printing jobs corresponding to an order for in which the plurality of printing jobs were previously processed.

The plurality of printing jobs may be received over different interfaces and different protocols.

The controlling unit may display information regarding protocols and interfaces corresponding to the received printing jobs.

The plurality of printing jobs may include at least one of a scanning job, a printing job, a faxing job, a copying job and a pre-stored job.

Exemplary embodiments of the present general inventive concept may also be achieved by providing a method of processing a printing operation in an image forming apparatus, the method including setting a print job property to be applied to a plurality of print jobs, selecting an order in which to process the plurality of print jobs, generating a single print job from the plurality of print jobs using the selected order, applying the print job property to the single print job, and storing the single print job, and storing at least one of the selected order and the print job property as connection information of the single print job, wherein the plurality of print jobs may be received from at least one external apparatus and the print job property may be received from an external apparatus.

The method may further include storing the single print job, and storing at least one of the selected order and the print job property as connection information of the single print job.

The method may further include retrieving the single print job according to the connection information.

Exemplary embodiments of the present general inventive concept may also be achieved by providing an image forming apparatus, including a controlling unit to generate a single print job from a plurality of print jobs using a selected order of processing the plurality of print jobs, and to apply a print job property to the single print job.

The image forming apparatus may further include an interface to connect to at least one external apparatus to receive the plurality of print jobs.

The print job property may be received from the at least one external apparatus.

The image forming apparatus may further include a user interface unit to receive an input to select one of the print job property and the order of processing the plurality of print jobs.

The image forming apparatus may further include a storage unit to store at least one of the plurality of print jobs, the single print job, the selected order, and the print job property.

The storage unit may store at least one of the selected order and the print job property as connection information of the single print job.

The controlling unit may retrieve the single print job according to the connection information.

BRIEF DESCRIPTION OF THE DRAWINGS

These and/or other features and utilities of the present general inventive concept will become apparent and more readily appreciated from the following description of certain exemplary embodiments, taken in conjunction with the accompanying drawings of which.

DETAILED DESCRIPTION OF THE EMBODIMENTS

Figure 1:
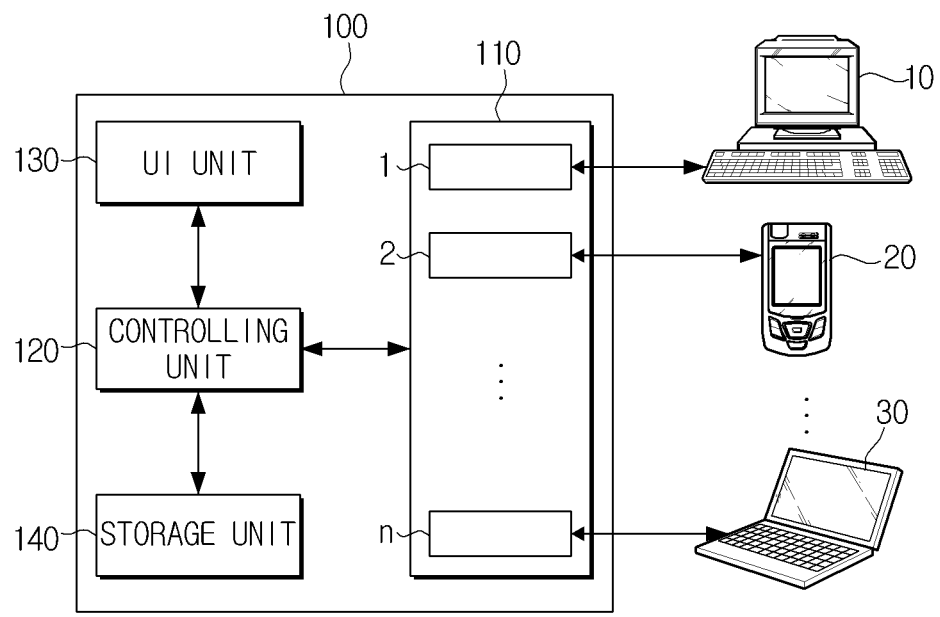
FIG. 1 is a block diagram illustrating an image forming apparatus according to exemplary embodiments of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating an image forming apparatus according to exemplary embodiments of the present general inventive concept. Referring to FIG. 1, an image forming apparatus 100 may include an interface 110, a controlling unit 120, a user interface (UI) unit 130, and a storage unit 140. The image forming apparatus 100 according to exemplary embodiments of the present general inventive concept may be a printer, a copy machine, a fax machine, a scanner, or a multi-functional peripheral (MFP) combining some or all of these functions. The image forming apparatus 100 can also include a means of recording an image onto a recording medium (not illustrated), which can be, for example, an ink jet type or electrophotographic type recording mechanism. The image forming apparatus 100 may also include a recording medium storage part to store recording media, and a mechanism to pickup and transfer a recording medium to and from the recording means. The image forming apparatus may also have a receiving part to receive recording media onto which an image has been recorded.

The interface 110 may include various interfaces 1 to n, which can be, for example, a universal serial bus (USB), a network interface, such as to a LAN or to the Internet, or a Bluetooth interface. Through each interface 1 to n, data are received from external apparatuses 10, 20, 30 or data are transmitted from the image forming apparatus to the external apparatuses 10, 20, 30.

The external apparatuses 10, 20, 30 can transmit data to the image forming apparatus 100 through an interface 110 and can receive data from the image forming apparatus 100 through the interface 110. External apparatuses 10, 20, 30 may be, for example, a host device, a mobile terminal, or a laptop computer.

The controlling unit 120 controls overall operations of the image forming apparatus 100. The controlling unit 120 may control printing operations of a plurality of printing jobs which are selected by a user from among printing jobs received from the external apparatuses 10, 20, 30 and from among predetermined printing jobs.

A plurality of printing jobs selected by a user can be changed to a single printing job using connection information to unify the plurality of printing jobs, and data corresponding to the single printing job can be printed out under the control of the controlling unit 120. The controlling unit 120 may generate connection information using various methods according to the present general inventive concept. A method of generating connection information of the controlling unit 120 according to the present general inventive concept will be explained below in detail.

While a single printing job may include a plurality of printing jobs in exemplary embodiments of the present general inventive concept, the single printing job may also include any one of a scanning job, a printing job, a faxing job, and a predetermined job.

The UI unit 130 provides a user interface (UI) to receive a user command for a plurality of printing jobs. Specifically, the UI unit 130 may provide a UI to generate connection information and a UI to select a plurality of printing jobs, and may also provide a UI to set a job property to be commonly applied to the selected printing jobs.

The UI to generate connection information may be applied, for example, when a user uses a copy function, a fax function, a print function or a scan function. Specifically, the controlling unit 120 can generate the connection information on the order of processing jobs such as copying, faxing, and printing, from a starting time to a finishing time set by a user through the UI to generate connections, can process the connection information, and can store the generated connection information in the storage unit 140.

If data corresponding to a plurality of printing jobs which have been previously processed is required to be reprinted, the controlling unit 120 can perform printing operations corresponding to the plurality of printing jobs using the stored connection information. Accordingly, there is no need for a user to input separate commands for scanning, copying, faxing, and printing out data corresponding to the plurality of printing jobs.

According to exemplary embodiments of the present general inventive concept, the controlling unit 120 may generate connection information to set a common printing job option for various types of printing jobs received from the external apparatuses 10, 20 30. A detailed description thereof will be provided with reference to FIGS. 2A to 2E.

FIGS. 2A to 2E are schematic views illustrating a user interface (UI) according to an exemplary embodiment of the present general inventive concept. In this exemplary embodiment of the present general inventive concept, a UI is displayed, for example, on a liquid crystal display (LCD) panel mounted on the image forming apparatus 100. Other types of displays are possible. Also, if an external apparatus 10, 20, 30 connected to the image forming apparatus 100 has a display function, the external apparatus may provide a UI substantially similar to that of the image forming apparatus 100. That is, the external apparatuses 10, 20, 30 of FIG. 1 may also display a UI. For example, the external apparatus 10, 20, 30 may, for example, receive UI information from the image forming apparatus 100 which allows the external apparatus 10, 20, 30 to generate a substantially similar UI to that of image forming apparatus 100. The external apparatus 10, 20, 30 may also have separately-installed instructions to enable the display of a substantially similar UI to image forming apparatus 100.

Figure 2A:
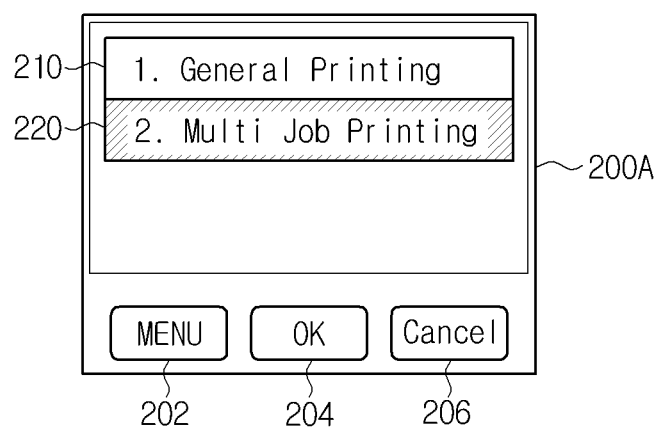
FIGS. 2A to 2E are schematic views illustrating a user interface (UI) according to exemplary embodiments of the present general inventive concept.

FIG. 2A illustrates a UI 200A to select a printing mode. The printing mode may be divided into a general printing mode 210 and a multi printing mode 220. In the general mode 210, conventional printing operations can be performed, and in the multi printing mode 220, a common property can be set for a plurality of printing jobs selected by a user or for printing operations to be performed using the pre-stored connection information without selecting the plurality of printing jobs one by one. The general printing mode 210 and the multi printing mode 220 can be selected, for example, by touching the desired mode on the UI 200A if the UI 200A is implemented as a touch screen. A mode can also be selected using, for example, buttons for each option disposed at one side of the UI 200A, arrow buttons or a scroll wheel permitting a user to scroll through printing mode options, or another selection means (not illustrated). When a selection is made on the UI 200A, the selection can be confirmed using an OK button 204. A selection can be cancelled using a Cancel button 206. Additional functions regarding the printing mode and/or functions of the image forming apparatus 100 can be accessed using Menu button 202.

Figure 2B:
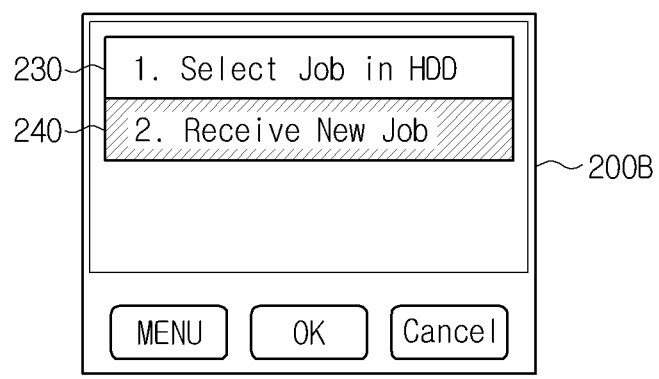

FIG. 2B illustrates a multi printing mode. In the multi printing mode, the UI 200B to select printing jobs is provided. The printing job may be a printing job 230 stored in the storage unit 140, such as a hard disk mounted in the image forming apparatus 100, or a new printing job 240 received from an external apparatus 10, 20 30. A selection can be made on the UI 200B as described above regarding FIG. 2A.

The process of receiving a new printing job from an external apparatus will now be explained. The UI unit 130 provides a UI to permit the selection of at least one external apparatus 10, 20, 30 which can be connected to the image forming apparatus 100. A user can select an external apparatus 10, 20, 30 from which to receive printing jobs through the UI. The printing jobs may be received using different protocols or through different interfaces (1 through n).

The controlling unit 120 can control the display of a plurality of jobs received at the image forming apparatus 100 using the different protocols and interfaces and information regarding the corresponding protocols and interfaces. For example, a first printing job can be received through a local area network (LAN), a second printing job can be received through a Bluetooth interface, and a third printing job can be received through a universal serial bus (USB). In this situation, information regarding each interface can be displayed in the UI unit 130 to correspond to the received printing jobs.

The controlling unit 120 may request that a printing job be transmitted from an external apparatus 10, 20, 30 selected through the UI. The controlling unit 120 can control the interface 110 so that the image forming apparatus 100 communicates with only the selected external apparatus 10, 20, 30. Accordingly, the controlling unit 120 can prevent non-selected external apparatuses 10, 20, 30 from transmitting data to the image forming apparatus 100, thereby preventing errors from occurring during the performance of the current operations.

Figure 2C:
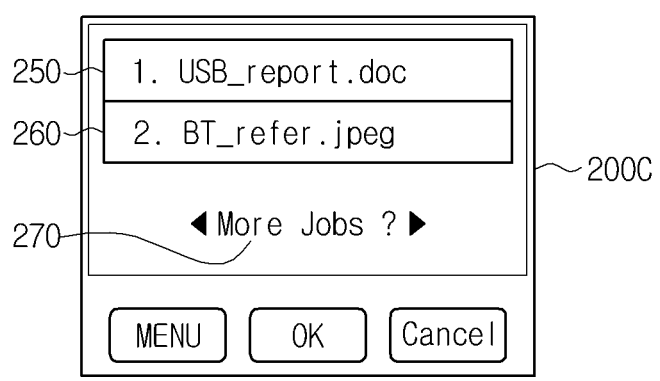

If a printing job is received from the selected external apparatus 10, 20, 30, the UI unit 130 can display the received printing job as illustrated in FIG. 2C, and thus a user is able to check the received printing job. FIG. 2C illustrates printing jobs 250 and 260 received from an external apparatus 10, 20, 30. While two printing jobs 250 and 260 are illustrated in FIG. 2C, this is not a limitation of the present general inventive concept, and any number of received printing jobs can be displayed. Additional printing jobs may be displayed on the UI 200C, for example, by scrolling through a list of received printing jobs with scroll arrows 270. Printing jobs may be selected from the UI 200C as described above with regard to the UI 200A.

Figure 2D:
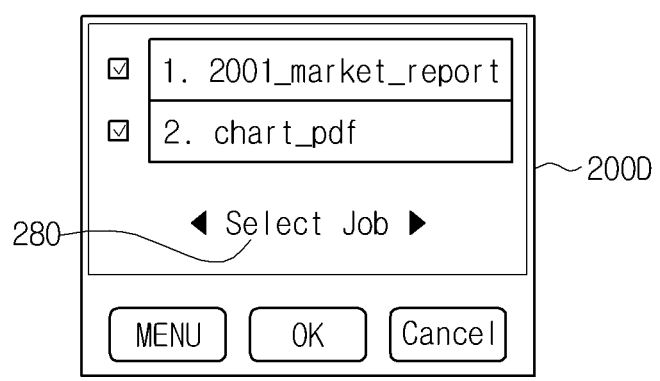

FIG. 2D illustrates a multi printing mode in which a printing job pre-stored in the storage unit 140 is selected. The pre-stored printing job may be an independent printing job or a single printing job unifying a plurality of printing jobs according to connection information. As with the UI 200C, any number of printing jobs can be displayed on the UI 200D, and additional printing jobs may be displayed, for example, by scrolling through a list using scroll arrows 280.

A method of selecting printing jobs from either an external apparatus or pre-stored printing jobs in an exemplary embodiment of the present general inventive concept will now be described with reference to FIGS. 2C and 2D. The printing jobs may be selected from both the external apparatuses 10, 20, 30 and the pre-stored printing jobs.

Figure 2E:
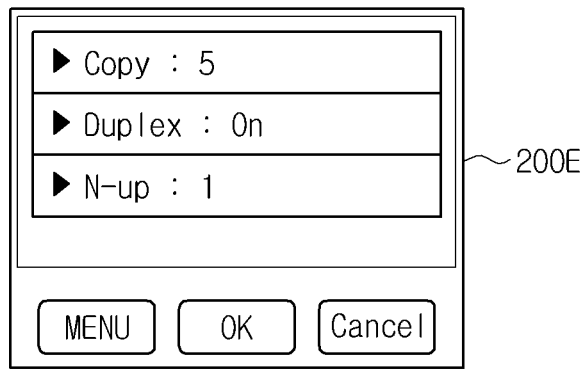

In FIGS. 2C and 2D, if printing jobs are selected, the order of processing the selected printing jobs can be input. The order of processing the selected printing jobs can be input, for example, by touching and dragging a selection into a desired order on the UI 200C, or by using buttons or a keyboard or other input device (not illustrated) to select the order. The job properties to be commonly applied to the selected printing jobs may be set as illustrated in FIG. 2E.

The printing job properties may be printing options regarding, for example, the number of sheets to be printed, duplex printing, N-up printing, color or monochrome printing, and post-processing operations. The post-processing operations may include a stapling or punching operation.

The controlling unit 120 may apply the set job properties to the selected printing jobs in the chosen processing order to perform a single printing job. That is, for example, if a first image file is received from a mobile phone, a text file is received from a host device, and a second image file is received from a laptop computer, the first and second image files and the text file can be processed as a single printing job even though the printing jobs for the first and second image files and the text file are received through different interfaces and protocols.

In this situation, printing jobs received from each external apparatus 10, 20, 30 (or from a host device) can be changed to printing data to which corresponding printing options are applied, and then the printing data can be emulated according to the commonly applied job properties so as to change the printing jobs to a single printing job. The printing options may be a command set by the corresponding external apparatus.

The controlling unit 120 may store a plurality of printing jobs which can be processed as a single printing job and can also store connection information corresponding to the printing jobs in the storage unit 140 in response to a user command.

If the connection information stored by a user is selected, the single printing job to which job properties of the plurality of jobs are applied may be re-performed using the connection information. Accordingly, user convenience is enhanced.

Figure 3:
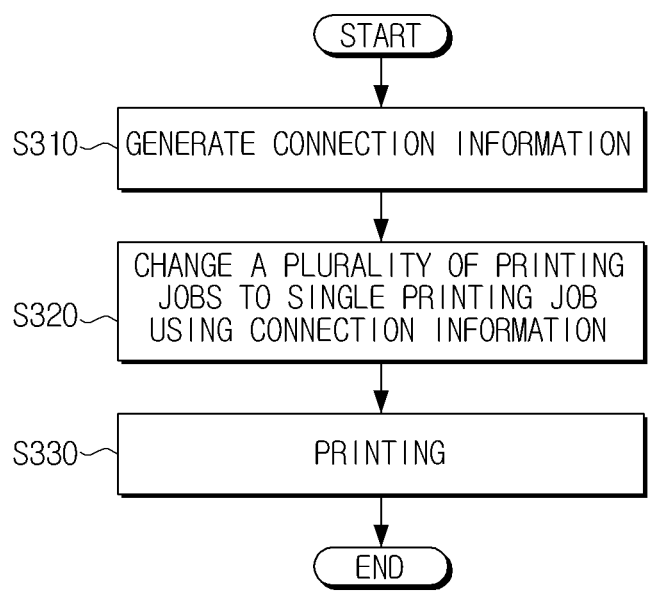
FIG. 3 is a flowchart illustrating a method of processing a printing operation of an image forming apparatus according to exemplary embodiments of the present general inventive concept.

FIG. 3 is a flowchart illustrating a method of processing a printing operation of an image forming apparatus according to an exemplary embodiment of the present general inventive concept. Referring to FIG. 3, connection information to unify a plurality of printing jobs is generated in operation S310.

The connection information may include various information, and may include the order in which the printing jobs are processed so as to correspond to a previous order in which the printing jobs were processed. For example, if printing jobs A, B, and C are processed sequentially, the connection information may be generated in the order of the printing jobs A, B, and C.

The connection information may be information set to apply a common job property to a plurality of printing jobs. For example, if a user selects printing jobs for which to set a common job property and sets the order of performing the printing jobs, the order may be information to unify printing jobs. Specifically, the connection information may be generated by recording a value corresponding to the selected printing job property to be processed in a specific field of a header or tail of each piece of printing job data. Alternatively, the controlling unit 120 may generate connection information by generating a schedule to process printing jobs and recording the generated schedule.

A plurality of printing jobs can be changed to a single printing job in operation S320, and data corresponding to the changed printing job are printed in operation S330. Accordingly, if previously performed operations are requested, the operations may be performed by simple manipulation, such as by selecting the changed printing job.

Figure 4:
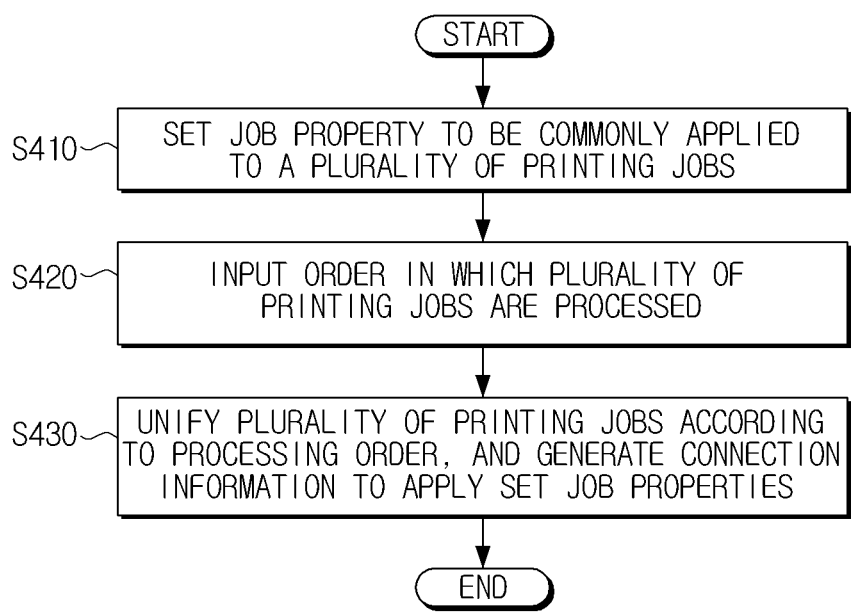
FIG. 4 is a flowchart illustrating a method of generating connection information according to an exemplary embodiments of the present general inventive concept.

FIG. 4 is a flowchart illustrating a method of generating connection information according to an exemplary embodiment of the present general inventive concept. Referring to FIG. 4, a job property to be commonly applied to a plurality of printing jobs is set in operation S410. The plurality of printing jobs may be received from various external apparatuses, such as external apparatuses 10, 20 30, through different interfaces and protocols, or may be selected by searching for predetermined printing jobs. In this situation, information regarding the plurality of printing jobs received through different interfaces and protocols and information regarding the corresponding interfaces and protocols may be displayed in UI unit 130.

The order in which the plurality of printing jobs are to be processed is input in operation S420. The plurality of printing jobs are unified according to the input processing order, and connection information to apply the set job properties is generated in operation S430.

Figure 5:
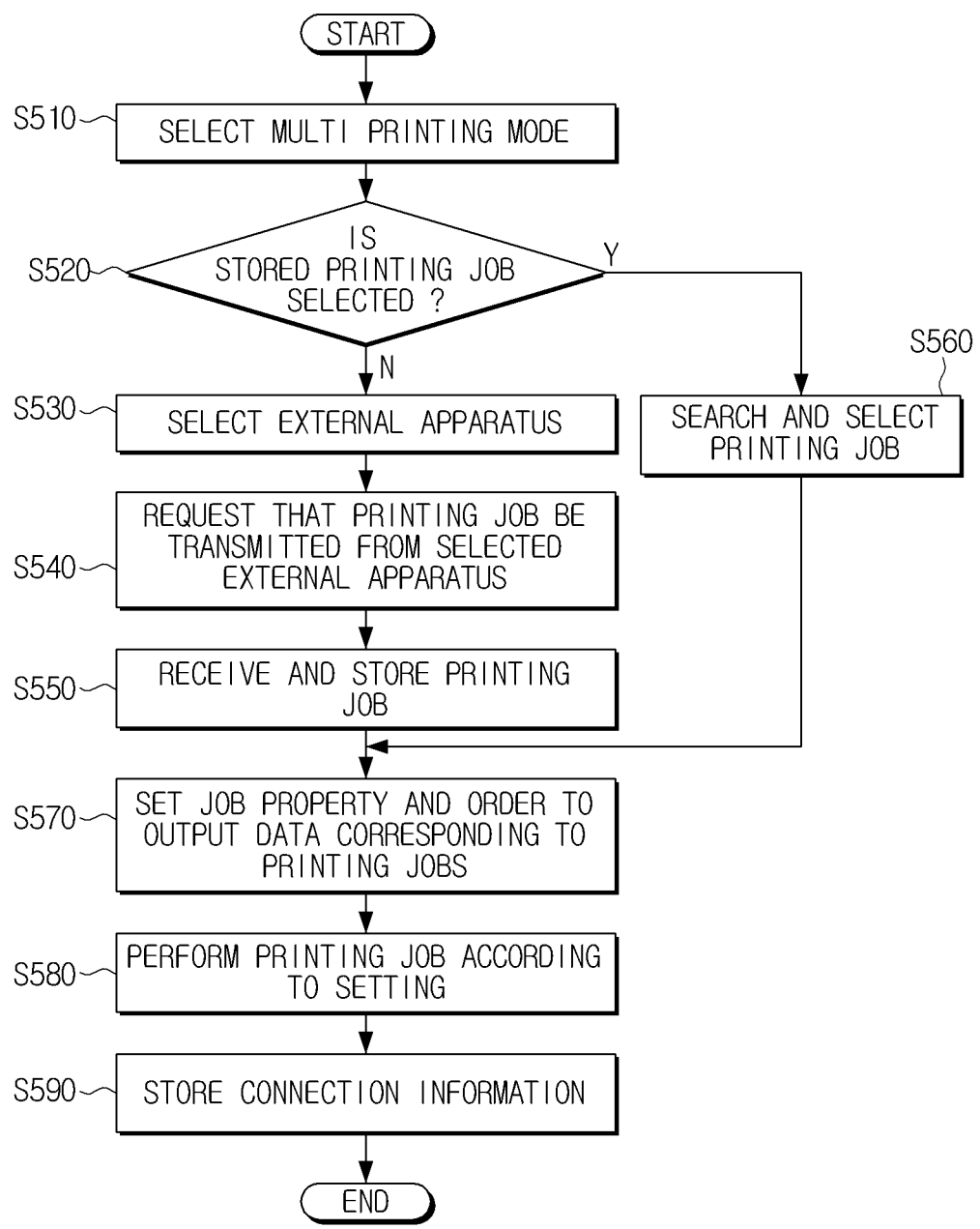
FIG. 5 is a flowchart illustrating a method of processing a printing operation of an image forming apparatus according to exemplary embodiments of the present general inventive concept.

FIG. 5 is a flowchart illustrating a method of processing a printing operation of an image forming apparatus according to an exemplary embodiment of the present general inventive concept. Referring to FIG. 5, if a multi printing mode is selected in operation S510, a plurality of printing jobs can be selected by a user.

If the stored printing job is selected i(operation S520-Y), the pre-stored printing jobs, for example, in storage unit 140, are searched to select the printing job to be processed (operation S560). If a user desires to receive a printing job from an external apparatus in operation S520-N, the external apparatus from which a printing job is received is selected in operation S530. At each operation, a user can cancel an operation or a user can return to a previous operation, for example, to change a selection or to correct a mistake.

If an external apparatus is selected, a request is sent for a printing job to be transmitted from the selected external apparatus in operation S540, and thus the selected printing job is received and stored in operation S550.

A job property to be commonly applied to the selected and/or received printing jobs and the order in which to output data corresponding to the printing jobs are set in operation S570. The printing jobs are arranged in the set order, the plurality of printing jobs are changed to a single printing job applying job property in operation S570, and the printing operation is performed in operation S580. Connection information may be stored according to the user selection in operation S590. The connection information may be information to apply job properties to the arranged printing jobs according to the set order.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A method of processing a printing operation in an image forming apparatus, the method comprising:
providing a user interface (UI) to select at least one external apparatus connectable to the image forming apparatus, where UI information is provided to the external apparatus selected to generate an external apparatus UI according to the UI information provided;
generating connection information to unify a plurality of printing jobs by:
inputting an order of processing the plurality of printing jobs; and
generating connection information to unify the plurality of printing jobs according to the processing order and to apply the set job properties;
changing the plurality of printing jobs to a single printing job using the connection information;
printing data corresponding to the single printing job; and
setting job properties to be commonly applied to the plurality of printing jobs,
wherein the single printing job is generated by unifying the plurality of printing jobs to which the commonly applied job properties are applied.

2. The method of claim 1, further comprising:
requesting that a printing job be transmitted from the external apparatus selected using the UI.

3. The method of claim 2, further comprising:
allowing communication only between the image forming apparatus and the selected external apparatus, and receiving at least one printing job from the selected external apparatus.

4. The method of claim 1, wherein the connection information comprises information regarding an order for processing printing jobs corresponding to an order in which the plurality of printing jobs were previously processed.

5. The method of claim 1, wherein the plurality of printing jobs are received over different interfaces and using different protocols.

6. The method of claim 5, further comprising:
displaying information regarding protocols and interfaces corresponding to the received printing jobs.

7. The method of claim 1, wherein the plurality of printing jobs comprises at least one of a scanning job, a printing job, a faxing job, a copying job and a pre-stored job.

8. The method of claim 1, wherein the job properties comprise at least one of the number of sheets to be printed, duplex printing, N-up printing, color or monochrome printing, and post-processing operations.

9. An image forming apparatus, comprising:
at least one interface to receive a plurality of printing jobs;
a storage unit to store connection information to unify the plurality of printing jobs;
a controlling unit to change the plurality of printing jobs to a single printing job using the connection information and to print data corresponding to the single printing job; and
a user interface (UI) unit to set job properties to be commonly set to the plurality of printing jobs,
wherein the single printing job is generated by unifying the plurality of printing jobs to which the commonly applied job properties are applied, and wherein the UI unit provides a UI to select at least one external apparatus connectable to the image forming apparatus and to input an order of processing the plurality of printing jobs, and the controlling unit unifies the plurality of printing jobs according to the processing order, applies the set job properties, and provides UI information to the external apparatus selected to generate an external apparatus UI according to the UI information provided.

10. The image forming apparatus of claim 9, wherein the controlling unit requests that a printing job be transmitted to the external apparatus selected using the UI.

11. The image forming apparatus of claim 10, wherein the controlling unit allows communication with only the selected external apparatus, and receives at least one printing job from the selected external apparatus.

12. The image forming apparatus of claim 11, wherein the controlling unit generates connection information so that printing options set by the external apparatus are applied to the received printing jobs, and if the order for processing jobs to which the printing options are applied is input, the controlling unit unifies the plurality of printing jobs according to the processing order and applies the set printing job properties.

13. The image forming apparatus of claim 9, wherein the controlling unit comprises information regarding an order for processing printing jobs corresponding to an order in which the plurality of printing jobs were previously processed.

14. The image forming apparatus of claim 9, wherein the plurality of printing jobs are received over different interfaces and different protocols.

15. The image forming apparatus of claim 14, wherein the controlling unit displays information regarding protocols and interfaces corresponding to the received printing jobs.

16. The image forming apparatus of claim 9, wherein the plurality of printing jobs comprise at least one of a scanning job, a printing job, a faxing job, a copying job and a pre-stored job.

17. A method of processing a printing operation in an image forming apparatus, the method comprising:
providing a user interface (UI) to select at least one external apparatus connectable to the image forming apparatus, where UI information is provided to the external apparatus selected to generate an external apparatus UI according to the UI information provided;
setting a print job property to be applied to a plurality of print jobs;
selecting an order in which to process the plurality of print jobs;
generating connection information to unify the plurality of print jobs according to the selected order to form a single print job;
applying the set print job property to the single print job, storing the single print job; and
storing generated connection information, including the selected order and the print job property,
wherein the plurality of print jobs are received from at least one external apparatus and the print job property is received from an external apparatus.

18. The method of claim 17, further comprising:
retrieving the single print job according to the connection information.

19. An image forming apparatus, comprising:
an external apparatus interface to receive a plurality of printing jobs;
a storage unit to store connection information to unify the plurality of printing jobs;
a user interface (UI) unit to receive a processing order of the plurality of printing jobs and to set job properties to be commonly set to the plurality of printing jobs; and
a controlling unit to unify the plurality of printing jobs according to the connection information and the processing order, and to apply the set job properties, wherein the UI unit provides a UI to select at least one external apparatus connectable to the image forming apparatus, and the controlling unit provides UI information to the external apparatus selected to generate an external apparatus UI according to the UI information provided.

\* \* \* \* \*